United States Patent
Chiu et al.

(10) Patent No.: US 7,486,371 B2
(45) Date of Patent: Feb. 3, 2009

(54) OPTICAL DEVICE AND METHOD FOR MAKING THE SAME

(75) Inventors: Chih-Ho Chiu, Taipei (TW); Hui-Lung Kuo, Taipei (TW); Mei-Chih Peng, Taoyuan Hsien (TW); Yi-Chun Liu, Hsinchu Hsien (TW); Pin-Chen Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 324 days.

(21) Appl. No.: 11/059,417

(22) Filed: Feb. 17, 2005

(65) Prior Publication Data

US 2006/0061725 A1 Mar. 23, 2006

(30) Foreign Application Priority Data

Sep. 17, 2004 (TW) .............................. 93128321 A

(51) Int. Cl.
*G02F 1/1339* (2006.01)
(52) U.S. Cl. .................. 349/155; 349/187; 264/494
(58) Field of Classification Search ................ 349/155, 349/187; 264/494
See application file for complete search history.

(56) References Cited

U.S. PATENT DOCUMENTS

| 5,236,635 | A | | 8/1993 | Yoshida | 264/1.4 |
|---|---|---|---|---|---|
| 5,299,289 | A | * | 3/1994 | Omae et al. | 349/201 |
| 5,528,400 | A | | 6/1996 | Arakawa | 359/73 |
| 5,611,985 | A | | 3/1997 | Kobayashi et al. | 264/291 |
| 5,986,734 | A | | 11/1999 | Winker et al. | 349/123 |
| 5,995,184 | A | * | 11/1999 | Chung et al. | 349/118 |
| 6,704,078 | B2 | * | 3/2004 | Ha et al. | 349/113 |
| 2002/0187283 | A1 | * | 12/2002 | Gu et al. | 428/1.2 |
| 2004/0110856 | A1 | * | 6/2004 | Young et al. | 522/6 |
| 2004/0150141 | A1 | * | 8/2004 | Chao et al. | 264/494 |
| 2005/0068487 | A1 | * | 3/2005 | Hsieh et al. | 349/155 |
| 2005/0271803 | A1 | * | 12/2005 | Liu et al. | 427/162 |

* cited by examiner

*Primary Examiner*—David Nelms
*Assistant Examiner*—Phu Vu
(74) *Attorney, Agent, or Firm*—Troxell Law Office, PLLC

(57) ABSTRACT

A method for making an optical device comprises steps of: 1) Providing a substrate, a polymerizable liquid crystal material having a plurality of liquid crystal molecules, and a mold having rows of trenches; 2) Imprinting the polymerizable liquid crystal material on said substrate by the mold; 3) Proceeding a cross-linking process to cure the liquid crystal material so as to have long axes of the liquid crystal molecules be aligned along the rows of trenches. The optical device made from the present method conforms to an A-plate type retardation plate. Moreover, the optical device is capable of aligning liquid crystal molecules adjacent to it.

28 Claims, 8 Drawing Sheets

OPTICAL DEVICE AND METHOD FOR MAKING THE SAME

FIELD OF THE INVENTION

The present invention relates to an optical device. More particularly, it relates to an optical device capable of phase retardation and capable of aligning liquid crystal molecules adjacent to the optical device.

BACKGROUND OF THE INVENTION

A liquid Crystal Display (LCD) is known as the most popular display among all kinds of panel displays, in which a liquid crystal molecules of the LCD as an imaging element is non-irradiant. That is to say that the liquid crystal molecules do not generate light itself, but are only used as a reactor in a polarization field. The liquid crystal molecules are controlled by applying voltages to modulate transmission of light. In other words, the liquid crystal molecules can be regarded as a light valve for modulating the light intensity.

In particular, the Twist Nematic (TN)-LCD 10 shown in FIG. 1A and FIG. 1B comprises a top substrate 101, a bottom substrate 111, a top alignment film 103, a bottom alignment film 113, a top polarizer 105, a bottom polarizer 115 and a liquid crystal layer 107. Wherein, the liquid crystal layer 107 comprises a plurality of liquid crystal molecules. Two optical axes of the top polarizer 105 and the bottom polarizer 115 are perpendicular to each other.

Please refer to FIG. 1A. When a voltage is applied, the liquid crystal molecules of the liquid crystal layer 107 would be aligned in a vertical direction as shown. In this situation, the state of polarized light from the bottom polarizer 115 would not change when it passes through the liquid crystal layer 107. Hence, the light would be blocked by the top polarizer 105 and the transmittance would be zero.

Please refer to FIG. 1B. When no voltage is applied, the liquid crystal molecules of the liquid crystal layer 107 would be affected by the top alignment film 103 and the bottom alignment film 113. The liquid crystal molecules would be presented as twist arrangement as shown. Thus, when the polarized light passes through the liquid crystal layer 107, the state of polarized light would have 90 degrees change. Thereby, the polarized light can be transmitted through the top polarizer 105.

It is noted that the top alignment film 103 and the bottom alignment film 113 play decisive roles in the LCD 10. Between the interface of alignment film 103 (or 113) and the liquid crystal layer 107, many sorts of forces, other than the electromagnetic force, such as the van der Waals force, the dipole-dipole interaction, and the hydrogen bonding are involved to affect the alignment of the liquid crystal molecules.

Besides, some microstructures also have some abilities to align liquid crystal molecules. This phenomenon is described by Berreman theory. In present, the most popular alignment method is to rub (buff) a polyimide (PI) surface of the substrate. For example, in a Rubbing process, a PI (polyimide) material is firstly applied to the substrate 101 (or 111), and then a rubbing step is executed to form the alignment film 103 (or 113).

While skills for making the LCD 10 are developed continuously, how to increase the viewing angle of LCD 10 becomes an important topic.

When an observer looks at the LCD 10 at an oblique angle, light transmitted from the LCD 10 would arrive the observer's eyes at a tilt incident angle. In this case, because the light path is different from the default setting (a perpendicular incident angle which is shown as FIG. 1B), the light would present elliptical polarization or other polarization state, and then thereby the top polarizer 105 would have difficulty in completely absorbing the light that should be absorbed under the default setting. Hence, some light leakages occur and lead to the color contrast degrades of the prior LCD 10.

To improve the phenomenon described above, many solutions are provided. "Optical Phase Compensation" is one of the methods, which is economically and easily put into practice. The general concept of this method is to use a retardation plate for retarding the phase of the incident light so as to form a new phase that could be absorbed by the top polarizer 105. Consequently, the viewing angle of the LCD 10 under this effort is enlarged.

Retardation plates are generally divided into three types: 1) an A-plate, which has an optical axis parallel to its substrate; 2) a C-plate, which has an optical axis perpendicular to its substrate; and 3) an O-plate, which has an optical axis tilt to its substrate at a predetermined angle. A typical A-plate is described in U.S. Pat. No. 5,995,184. A typical C-plate is described in U.S. Pat. No. 5,528,400. A typical O-plate is described in U.S. Pat. No. 5,686,734.

Methods of making the A-plate are generally divided into two categories. One category of making the A-plate generally comprises two steps: 1) producing a film with polymer particles by extrusion or by solvent casting; and 2) applying tension to extend the film. For example, in U.S. Pat. No. 5,236,635, Toru Yoshida et al disclosed a method of making an A-plate by a polycarbonate (PC) material from a solvent casting. In U.S. Pat. No. 5,611,985, Hitoshi Kobayashi and Takao Saito et al disclosed a polysufone (PS) material. Though materials used in this category are relatively cheap, yet the film-extending step is painfully required. Besides, in casting the polymer particles, high boiling point and high polar solvent is needed to be used. Generally, the method of above is hard to achieve and procedures are complicated.

Another category of making the A-plate is to utilize a polymerizable liquid crystal material. A birefringence (two refractive index in two different direction) property of the liquid crystal material is suitable for making retardation plates. For example, in U.S. Pat. No. 5,995,184, Chung Young J et al disclosed how to make an A-plate 20 with a polymerizable liquid crystal material, as shown in FIG. 2. The method generally comprises steps of: 1) coating an alignment layer 203 to the substrate 201; 2) mixing the surfactant with polymerizable liquid crystal material; 3) applying a thin film of a mixed solution 206 to the alignment layer 203, and aligning the liquid crystal molecules 215 within the alignment layer 203 as shown in FIG. 2; and 4) polymerizing the thin film 205 to preserve the orientation by adjusting the temperature. Therefore, the surfactant could reduce the intrinsic tilt orientation of long axes of liquid crystal molecules 215 near the liquid crystal 205/air 209 interface, and the A-plate could be obtained.

Nevertheless, disadvantages of obtaining the aforesaid A-plate 20 of FIG. 2 are: 1) that a high temperature is required to form the alignment layer 203 onto the substrate 201, in which the substrate 201 definitely needs to be made of a heat-resistant material; and 2) that a rubbing step is usually applied to the alignment layer, from which some defects to the A-plate 20 are usually generated.

As described above, while the retardation plates become important in the LCD for obtaining an enlarged-viewing angle, the technique how to develop a device capable of optical retarding without sacrificing functions of the LCD is now an important issue in the art.

SUMMARY OF THE INVENTION

The primary object of the present invention is to provide an optical device, which is capable of phase retardation to light, so as to enlarge the viewing angle of an LCD.

Another object of the present invention is to provide an optical device, which is capable of replacing the prior retardation plates.

Another object of the present invention is to provide a simple-structured optical device, which is capable of performing functions of an LCD.

Another object of the present invention is to provide an optical device, which does not have the prior alignment films.

The present invention provides an optical device and the method for making the optical device. The optical device for an LCD is capable of phase retardation to light as well as aligning liquid crystal molecules in the LCD.

The present method comprises following steps. 1) Provide a substrate, a mixture of the polymerizable liquid crystal material solution and a mold having rows of trenches. 2) Imprint the polymerizable liquid crystal material on the substrate by the mold. 3) Proceed a cross-linking process to cure the liquid crystal material.

According to the method, the finished optical device has rows of trenches on its surface. The pitch of the rows of trenches is about 0.1 µm~5 µm, while the depth of the rows of trenches is about 0.1 µm ~2 µm. Long axes of the liquid crystal molecules in the optical device are aligned along the rows of trenches. Orientation and birefringence property of the liquid crystal material makes the present optical device conform to an A-plate type retardation plate. In the present invention, several experiments are provided to prove the alignment ability of the optical device.

In the present invention, an optical device capable of phase retardation is provided. The optical device is capable of enlarging viewing angles of an LCD. In the method to produce the present optical device, all procedures can be carried out under normal pressure and normal temperature. In the procedures, no alignment layer or surface-active material is needed. Also, no rubbing step is needed in the present invention. Upon such an arrangement, the present optical device can be produced with less defects and be capable of aligning neighboring liquid crystal molecules.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
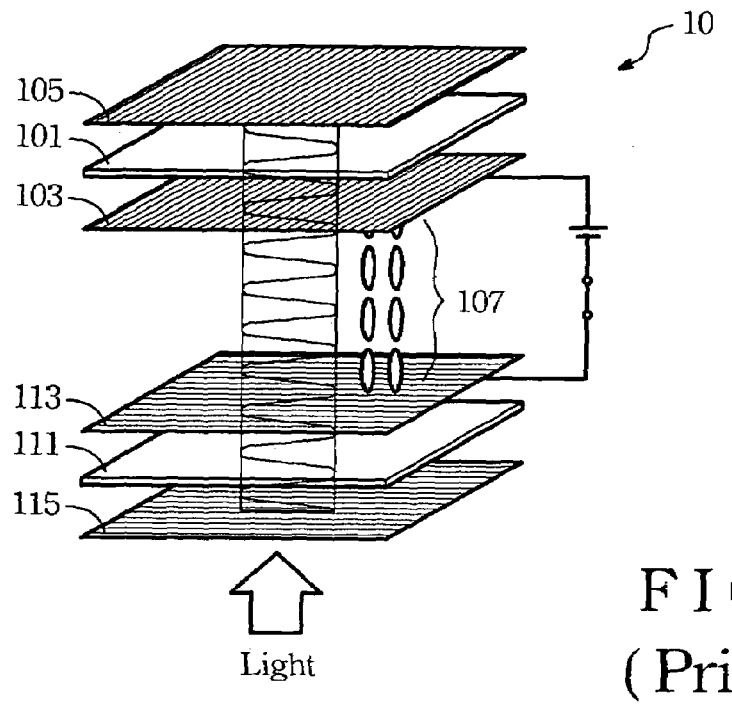
FIG. 1A is a schematic view of a conventional TN-LCD with an applying voltage.
Figure 1B:
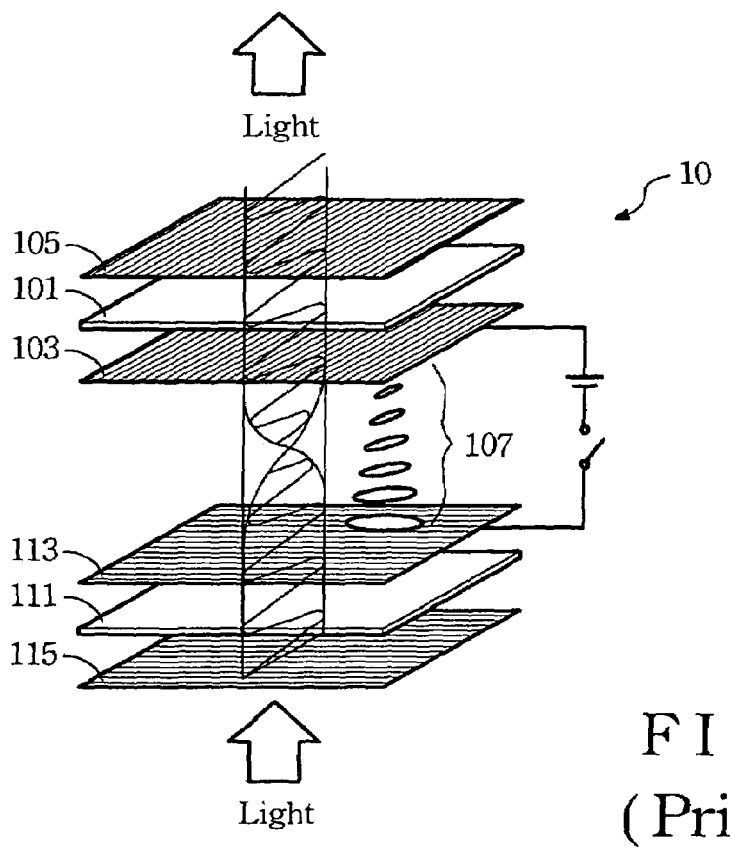
FIG. 1B is a schematic view of a TN-LCD of FIG. 1A without an applying voltage.

The present invention provides an optical device and a method for making the aforesaid optical device. The optical device is capable of phase retardation to light and is capable of aligning liquid crystal molecules. In view of "Optical Phase Compensation" or the phase retardation, the present invention provides an A-plate, which has a optical axis parallel to its substrate. In view of the function to aligning liquid crystal molecules, the optical device can align the long axes of the liquid crystal molecules with a predetermined direction on the surface of the present invention. Therefore, it could replace prior alignment film (113 or 103 in FIG. 1) of the LCD 10 efficiently.

Please refer to FIGS. 3A~3E, which describe the method for making the optical device 35 of the present invention. The method generally comprises following steps.

Firstly, in the present invention, a substrate 351, a polymerizable liquid crystal material 353 (solution type) and a mold 355 are provided. The mold 355 has rows of trenches. The pitch of the rows of trenches is about 0.1 µm~5 µm, and the depth of the rows of trenches is about 0.1 µm~2 µm.

Figure 3A:
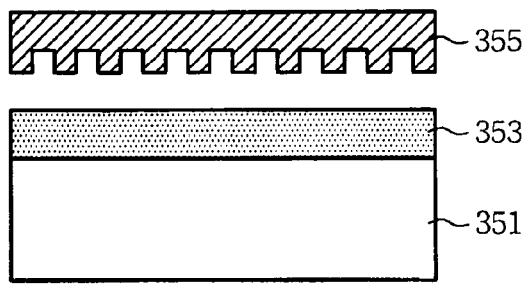
FIG. 3A~3E schematically show the preferred method of making the optical device of the present invention.
Figure 3B:
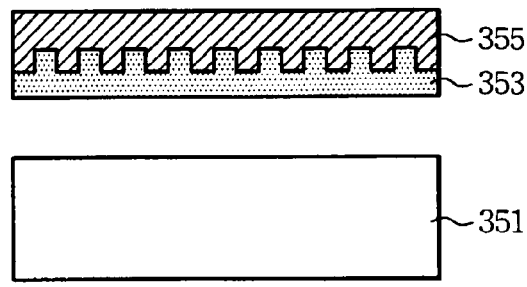
Figure 3C:
Figure 3C:
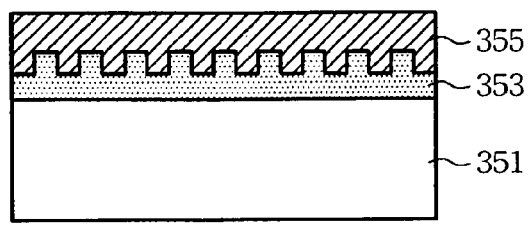

In FIG. 3A, the liquid crystal material 353 is applied onto the substrate 351. In FIG. 3B as a replacement embodiment of FIG. 3A, the liquid crystal material 353 is applied onto the mold 355. In either FIG. 3A or FIG. 3B, various methods such as a spin coating, a slot die coating, a blade coating and so on can be used to apply the liquid crystal material 353 onto the substrate 351 or the mold 355.

Next, the liquid crystal material 353 is imprinted on the substrate 351 by the mold 355 for the liquid crystal molecules of liquid crystal material 353 to be aligned by the rows of trenches. Thereby, to be verified in later paragraphs, the long axes of the liquid crystal molecules are aligned alongside the direction corresponding to the rows of trenches. Hereafter, the substrate 351, the liquid crystal material 353, and the mold 355 are disposed into an apparatus that provide controllable conditions of an imprinting pressure, an atmosphere pressure, or a temperature to continue the following steps.

A cross-linking process is proceeded to cure (in other words, to polymerize or to solidify) the liquid crystal material 353. Hence, the orientation of the liquid crystal molecules is preserved. The cross-linking process includes two conditions: 1) providing a predetermined temperature to the liquid crystal material 353; and 2) exposing the liquid crystal material 353 to a light of a predetermined range of wavelength.

Preferably, the predetermined temperature is less than 200° C., and the predetermined range of wavelength is about 200 nm~600 nm.

After the liquid crystal material 353 is cured, the substrate 351 and the mold 355 can be removed. The finished optical device 35 is shown in FIG. 3B. In the present invention, the substrate 351 can be made of glass, plastics, or any proper transparent material, in which the plastics can be chosen from the group of PET, PAC, PES, PS, PC, PMMA, and Zeon. Also, in another embodiment of the present invention, the substrate 351 can remain on the optical device 35.

The mold 355 can be made from materials such as wafer silicon, metal, quartz, glass, metal oxide, or polymer. For removing the mold 355 from the finished optical device 35 more easily, a release layer could be formed on the surface of the mold 355 in advance. For example, in one embodiment, C4F8 is formed previously on the surface of the mold 355 by using a plasma enhanced chemical vapor deposition (PECVD). In other embodiments, materials with long carbon chains or with fluorine function groups that are naturally hydrophobic can be used to form the release layer.

Figure 2:
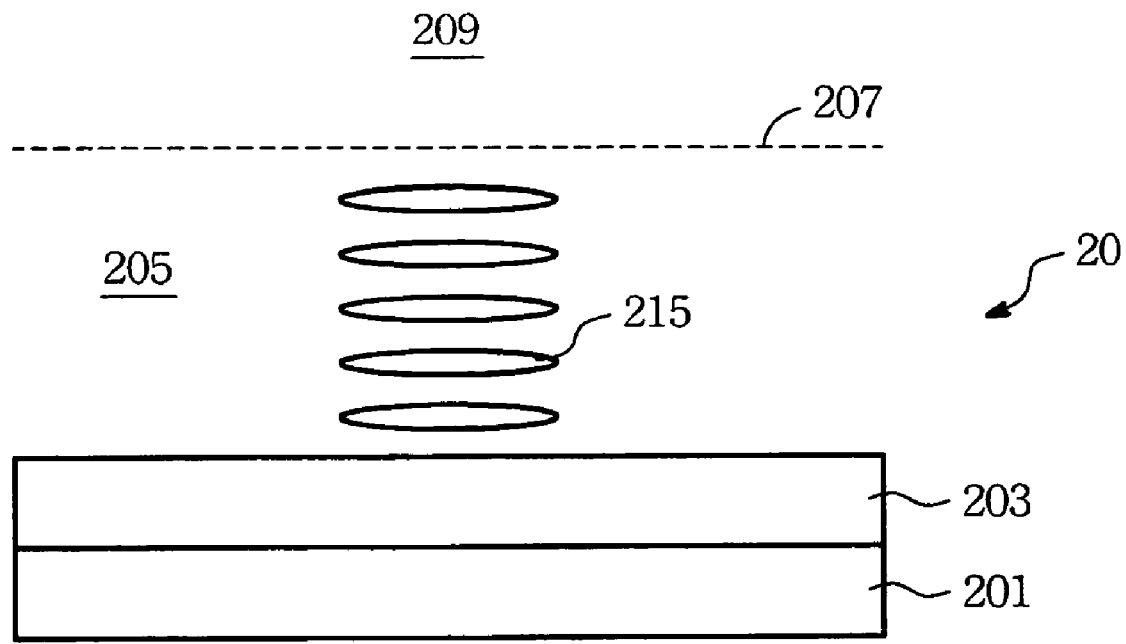
FIG. 2 is a schematic view of a conventional A-plate.

Comparing the present method for making the optical device 35 with the prior method described in FIG. 2. The present method needs neither the alignment layer 203 nor the surface-active material 207 shown in FIG. 2. The orientation of the liquid crystal molecules in the optical device 35 is decided by the rows of trenches of the mold 355, not by the material interactions in the alignment layer 203. Furthermore, conditions excluding the high temperature and the high pressure in the present invention make the present invention easily to be put into practice.

Figure 3D:
Figure 3D:
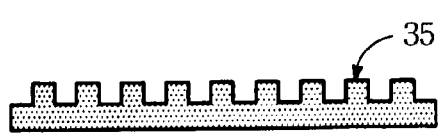
Figure 3E:
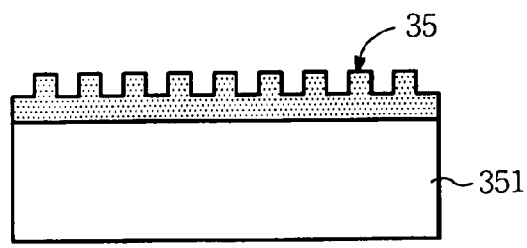

Please refer to FIG. 3D or FIG. 3E. The finished optical device 35, which is shaped by the mold 355, has corresponding structures of rows of trenches on top. The pitch of the rows of trenches is about 0.1 µm~5 µm, and the depth of the rows of trenches is about 0.1 µm~2 µm. The long axes of the liquid crystal molecules in the optical device 35 are aligned along the rows of trenches. This orientation as well as the birefringence property of the liquid crystal material make the present optical device 35 meet the requirement as an A-plate type retardation plate.

In various kinds of embodiments, nematic liquid crystal materials, chiral nematic (cholesteric) liquid crystal materials, smectic liquid crystal materials and discotic liquid crystal materials can be selected as the liquid crystal material 353. The solution-type liquid crystal material 353 further comprises an initiator and a solvent. The initiator can be an Irgacure369®, an Irgacure907® (Ciba Geigy) and so on, and the solvent can be chosen from toluene, EA, NMP, CP, any the like or the mixture of them.

The following paragraphs describe individual embodiments, experiments, and data in accordance with the present invention to further illustrate the method for making the optical device 35 and some of its properties.

<Experiment 001>

SLM90519 (an oligomeric liquid crystal material From Wacker), lrgacure369 as the initiator and toluene as the solvent are applied in this embodiment. Three sets of solution type liquid crystal materials 353, individually with 10%, 20% and 30% of SLM90519 in concentration, are prepared. Then these three sets of solutions are applied on three molds 355 individually by a spin coating with a spin rate of 2000 rpm. The imprinting pressure is about 1.5 kg/cm2 and the temperature is about 120° C. The cross-linking process is meant to exposing the liquid crystal material 353 to ultraviolet light. The liquid crystal material 353 is cured, and then the three finished optical devices 35 are measured to test their phase retardation property. The experiment data is shown in the following Table.1. It shows that the retardation value positively changes with the variation of SLM90519 concentration.

TABLE 1

| Concentration of SLM90519 (wt./wt.) | 10% | 20% | 30% |
|---|---|---|---|
| Retardation value | 80 nm | 126 nm | 162 nm |

<Experiment 002>

SLM90519 is used as the liquid crystal material 353, Irgacure369 is used as the initiator, and toluene is used as the solvent. Three sets of solution type liquid crystal material 353, individually with 10%, 20% and 30% of SLM90519 in concentration, are prepared. These three sets of solutions are applied on three substrates 351 individually by a spin coating with a spin rate of 3000 rpm. The imprinting pressure is about 1.5 kg/cm2, and the temperature is about 120° C. The cross-linking process is meant to exposing the liquid crystal material 353 to ultraviolet light. The liquid crystal material 353 is cured, and the three finished optical devices 35 are measured to test their phase retardation property. The experiment data is shown in the following Table 2. It shows that the retardation value positively changes with the variation of SLM90519 concentration.

TABLE 2

| Concentration of SLM90519 (wt./wt.) | 10% | 20% | 30% |
|---|---|---|---|
| Retardation value | 91 nm | 156 nm | 220 nm |

<Experiment 003>

RMS03-001 produced by Merck© is used to prepare the solution type liquid crystal material 353. Then, the solution is applied onto the mold 355 by a spin coating with a spring rate of 2000 rpm. The liquid crystal material 353 is imprinted between the substrate 351 and the mold 355 under an imprinting pressure about 1.5 kg/cm2 and a temperature about 70° C. Next, the cross-linking process is carried out by ultraviolet light radiation to cure the liquid crystal material 353. In this embodiment, the phase retardation value of the finished optical device 35 is about 170 nm.

<Experiment 004>

SLM90519, Irgacure369 as an initiator and toluene as a solvent are applied in this embodiment to prepare the solution type liquid crystal material 353. Then, the solution is applied onto the mold 355 by a spin coating with a spin rate of 2000 rpm. The liquid crystal material 353 is imprinted between the substrate 351 and the mold 355. The imprinting pressure is about 0.05 kg/cm2, and the temperature is about 150° C. Next, the cross-linking process is carried out by ultraviolet light radiation to cure the liquid crystal material 353.

Figure 4:
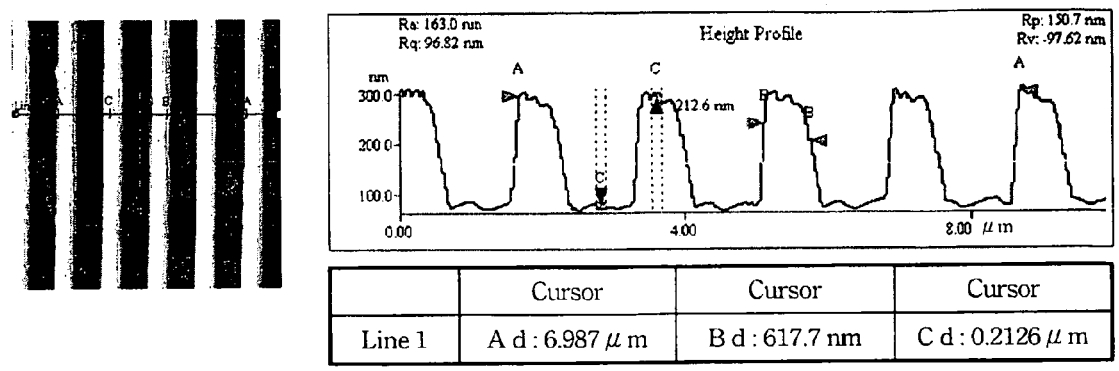
FIG. 4 is an AFM diagram of the present optical device.

An AFM (Atomic Force Microscopy) is used to investigate the microstructures on the surface of the finished optical device 35. FIG. 4 shows the AFM diagram of this experiment. It confirms that there are rows of trenches on the surface of optical device 35. The pitch of the rows of trenches is about 1.8 µm (6.9874/4=1.8). The width of the trenches is about 0.6 µm (the distance shown as B-B in FIG. 4). The depth of the trenches is about 0.2 µm (the distance shown as C-C in FIG. 4). The phase retardation value of the optical device in this embodiment is measured as 160 nm.

<Experiment 005>

This experiment is for observing the relationship between the phase retardation value of the optical device 35 and the incident angle of light. SLM90519, Irgacure369 as the initiator and Methylbenzene as the solvent are applied in this embodiment to prepare the solution type liquid crystal material 353. The concentration of the solution is 20%. This solution is applied to two following samples providing two different conditions.

Sample 1: the imprinting pressure is 0.07 kg/cm2, and the temperature is 150° C.

Sample 2: the imprinting pressure is 1.5 kg/cm2, and the temperature is 120° C.

Figure 5:
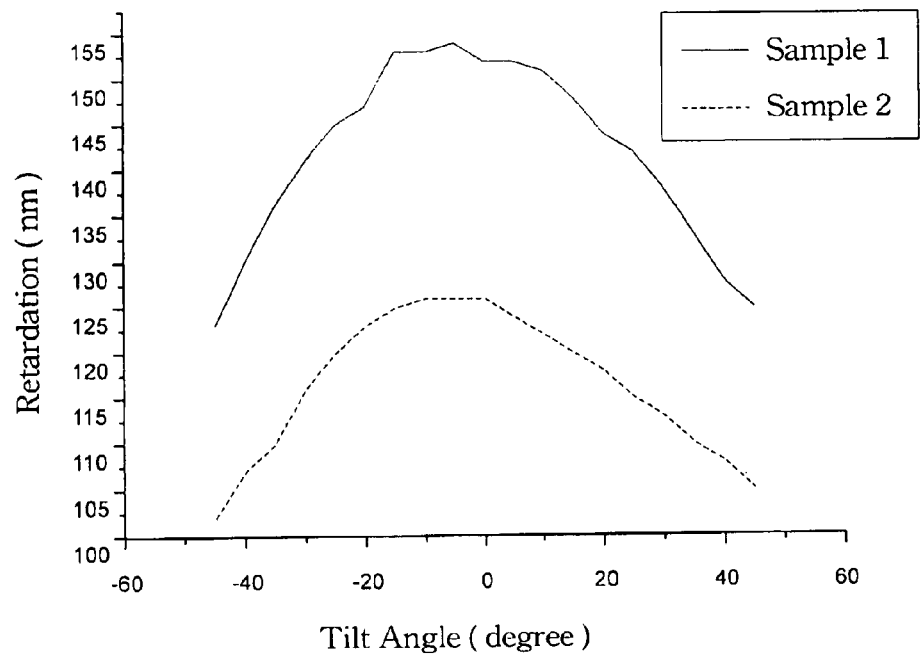
FIG. 5 is an incident angle—retardation value diagram of the present optical device.

Through changing the incident angle of light, an incident angle-retardation value diagram is shown in FIG. 5. It is noted that the retardation value decreases while the incident angle increases.

<Experiment 6>

This experiment is mainly to prove that the liquid crystal molecules within the optical device 35 are aligned in a specific orientation, i.e. to determine whether the long axes of the liquid crystal molecules are aligned along the rows of trenches.

SLM90519, Irgacure369 as the initiator and toluene as the solvent are applied in this embodiment to prepare the solution type liquid crystal material 353. In the imprinting step, the imprinting pressure is about 1.5 kg/cm2, and the temperature is about 120° C. The liquid crystal material 353 is exposed to ultraviolet light so as to be cured and the optical device 35 is shown.

Figure 6:
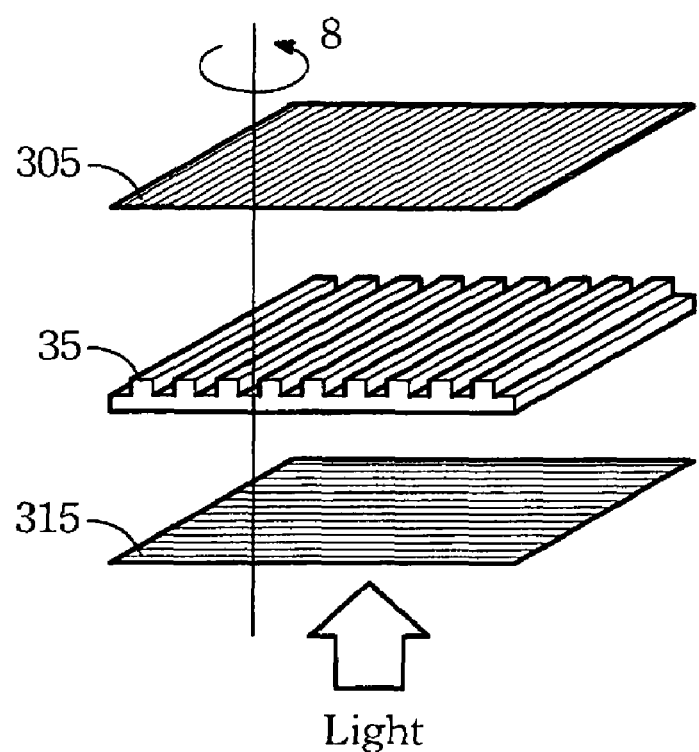
FIG. 6 schematically shows configuration of Experiment 006 of the present invention.

Please refer to FIG. 6. FIG. 6 shows the configuration of this experiment. The prepared optical device 35 is disposed between a top polarizer 305 and a bottom polarizer 315. The optical axis of top polarizer 305 is perpendicular to the optical axis of bottom polarizer 315. So if the optical device 35 did not work, the light of polarization state would remain the same as the bottom polarizer 315. Hence, light would be absorbed at the top polarizer 305, and a "dark state" shall appear while observing the top polarizer 305 from top of the figure.

Figure 7A:
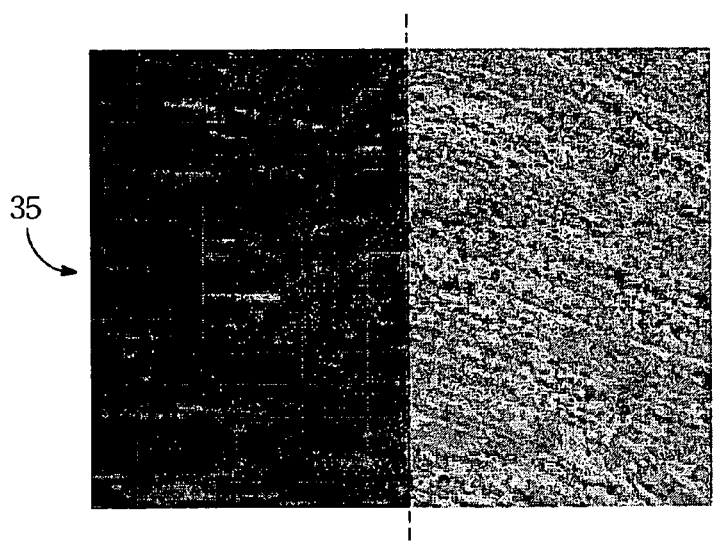
FIG. 7A is a photograph (top view) of the top polarizer 305 of FIG. 6 at a circumstance that the optical axis of the optical device and the optical axis of the top polarizer have an identical direction.
Figure 7B:
FIG. 7B is a photograph (top view) of the top polarizer 305 of FIG. 6 at a circumstance that the optical axis of the optical device and the optical axes of the top polarizer have a rotation angle as 45 degree.
Figure 7C:
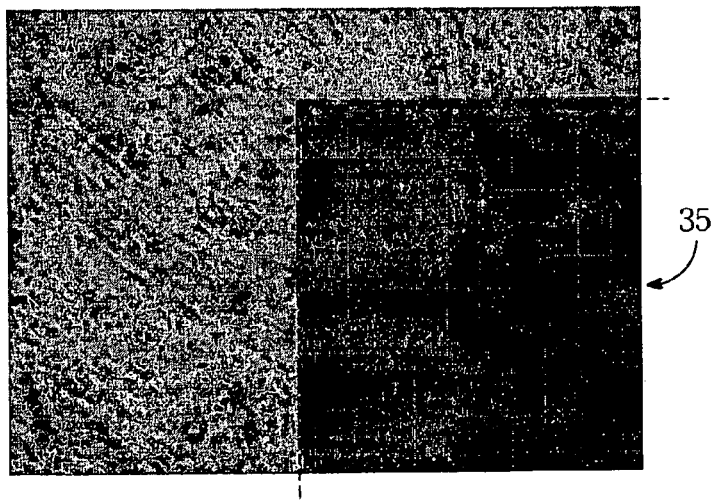
FIG. 7C is a photograph (top view) of the top polarizer 305 shown in FIG. 6 at the circumstance that the optical axis of the optical device and the optical axis of the top polarizer have a rotation angle as 90 degree.

In the case that the optical device 35 is disposed between the top polarizer 305 and the bottom polarizer 315, the optical device 35 is rotated about 45 degrees(shown by the arrow 8). Pictures are taken while the optical axis of the optical device 35 and the optical axis of the polarizer 315 have a) a rotated angle of 0 degree (FIG. 7A), b) a rotated angle of 45 degrees (FIG. 7B), and c) a rotated angle of 90 degrees (FIG. 7C). As shown, the "dark state" can only appear in FIG. 7A and FIG. 7B.

The phenomenon shown in the pictures could be expressed that the liquid crystal molecules in optical device 35 are indeed aligned in a specific direction. If the liquid crystal molecules were not aligned as described, the three pictures above (FIG. 7A~C) shall show no difference because a random orientation of liquid crystal molecules would make the rotated angle meaningless and the light would become un-polarized again. On the other hand, for the three pictures show differences in brightness, the specific orientation of the liquid crystal molecules in optical device 35 is verified.

<Experiment 007>

This experiment is mainly for certifying that the optical device 35 is capable of aligning other liquid crystal molecules on the surface. In this embodiment, SLM90519, Irgacure369 as the initiator and toluene as the solvent are applied to prepare the solution type liquid crystal material 353. In the imprinting step, the imprinting pressure is about 0.05 kg/cm2, and the temperature is about 150° C.

<Experiment 007A>

Figure 8A:
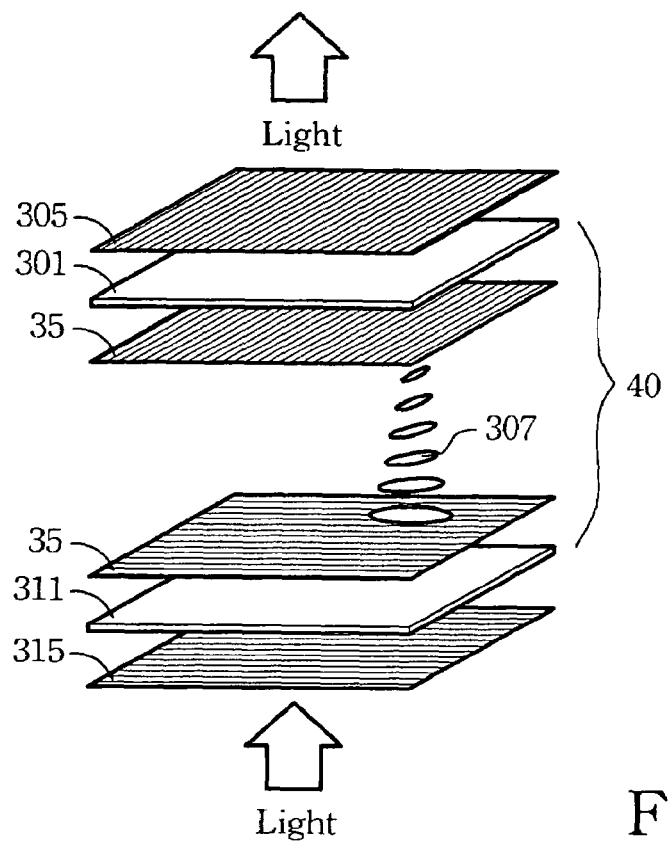
FIG. 8A schematically shows configuration of the Experiment 008A of the present invention.

According to conditions described above, two optical devices 35 are made. As shown in FIG. 8A, one of the optical devices 35 is disposed above the bottom substrate 311 and the other is disposed below the top substrate 301, in which axes of the two optical devices 35 are perpendicular to each other.

A liquid crystal layer is then disposed between the top substrate 301 and the bottom substrate 311. The ZLI-2293 (produced by Merck©) is used as the liquid crystal layer. If the optical device 35 is capable of aligning the liquid crystal molecules 307 of the liquid crystal layer, then these liquid crystal molecules 307 should be arranged as shown in FIG. 8A. Here, we define a liquid crystal cell 40, which comprises the top substrate 301, the bottom substrate 311, these two perpendicular optical devices 35, and the liquid crystal layer therebetween.

The liquid crystal cell 40 is disposed between a top polarizer 305 and a bottom polarizer 315. The optical axis of top polarizer 305 is perpendicular to the optical axis of bottom polarizer 315. If the liquid crystal cell 40 did not exist, then the light remaining at a first polarization state after it pass through the bottom polarizer 315 would be absorbed at the top polarizer 305. Then, a "dark state" would appear while observing the top polarizer 305 from top of it. However, the liquid crystal molecules 307 retards the light and light would turn into a second polarization state which has a phase retardation about 90 degrees to the first polarization state. Hence, the light with the second polarization state could pass through the top polarizer 305. So a "bright state" appears while observing the top polarizer 305 from top of it.

<Experiment 007B>

Figure 8B:
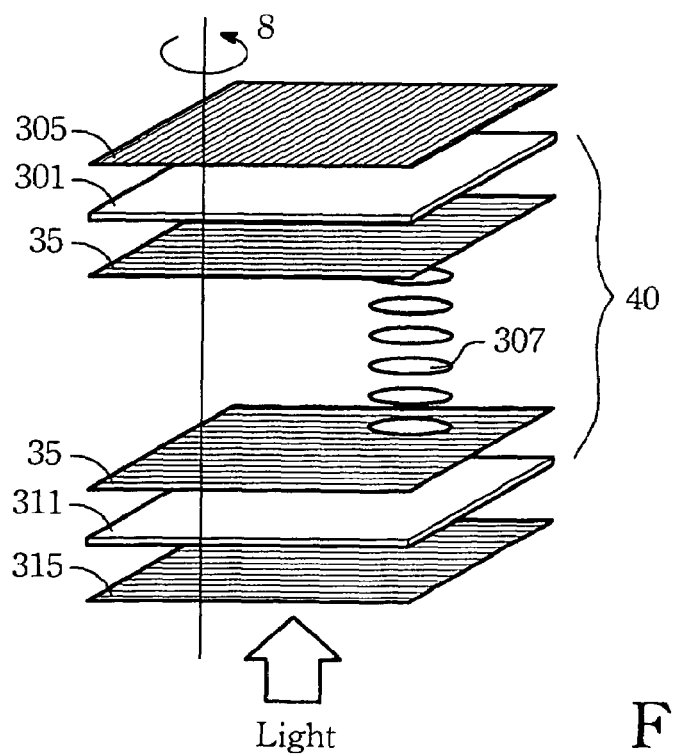
FIG. 8B schematically shows configuration of the Experiment 008B of the present invention.

Most experimental conditions are the same as that in the previous experiment 007A. However, a major difference between these two experiments is that the axes of the two optical devices 35 in the liquid crystal cell 40 are parallel to each other in this experiment shown in FIG. 8B.

Figure 9:
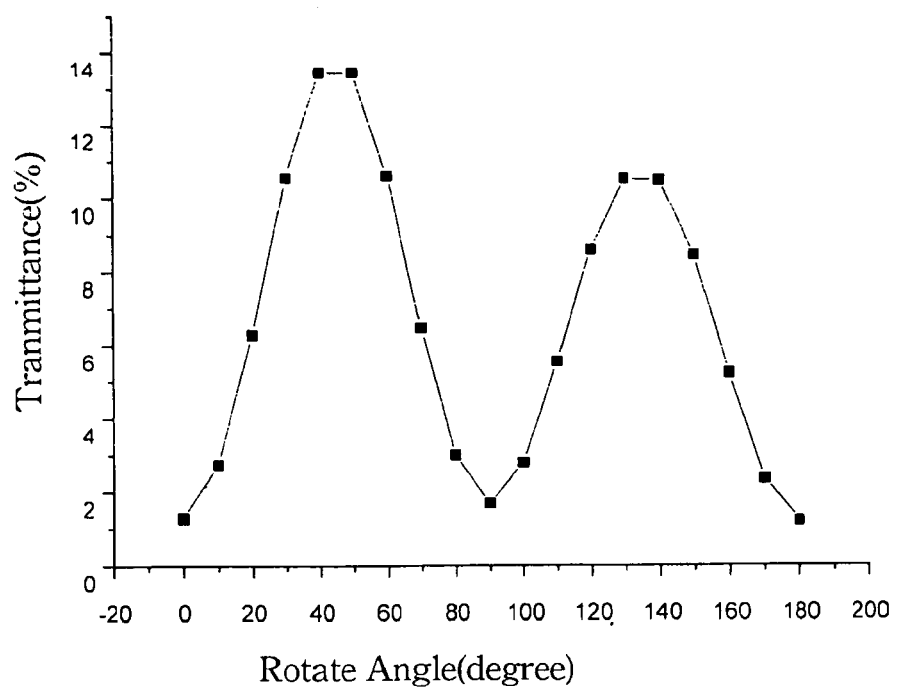
FIG. 9 is a rotation angle—light transmittance diagram of the Experiment 008B.

The liquid crystal cell 40 is disposed between a top polarizer 305 and a bottom polarizer 315. Then the liquid crystal cell 40 is rotated with an axle centre (shown by the arrow 8). In this experiment, the transmittance of light is measured while the liquid crystal cell 40 is rotated. A 100% transmittance is defined upon the transmittance situation that both of the top polarizer 305 and the bottom polarizer 315 are removed. Results of this experiment are shown in FIG. 9. It shows that the maximum value of transmittance is obtained when the optical axes of the optical device 35 and the optical axes of the polarizer 315 have a rotated angle at 45 degrees.

<Experiment 008>

This experiment is also to verify that the optical device 35 is capable of aligning other liquid crystal molecules on the surface. Here, two different samples are described as following:

Sample 3: Four optical devices 35 adopt SLM90519. Each of them has rows of trenches with a pitch of about 1.8 μm and a depth of about 0.2 μm. A K solution, which includes the liquid crystal material SLM90519 doped with dye SI-428 (produced by Mitsubishi©), is coated on all four optical devices 35. After annealing step with 5 minutes (30° C., 60° C., 80° C., and 100° C. to difference devices), the film is exposed to ultraviolet light to solidify.

Sample 4: Four optical devices 35 adopt Dsolite 4D5-57 (an organic-inorganic hybrid material). Most conditions of making the optical devices 35 are the same as the optical device 35 of Sample 3. The K solution is also coated on all four optical devices 35 of Sample 4. After annealing step with 5 minutes(30° C., 60° C., 80° C., and 100° C. respectively), the film is exposed to ultraviolet light to solidify.

The dye SI-428 can present the arrangement of the liquid crystal material SLM90519 in the K solution by means of the guest-host system. Therefore, the light-absorbing property of the dye could be used here. The extinction ratio (T∥/T⊥) of the eight cured products are measured and shown in FIG. 10, in which the T∥ means the transmittance ratio of light that has the optical axis parallel to the cured product, while the T⊥ means the transmittance ratio of light that has the optical axis perpendicular to the cured product.

Figure 10:
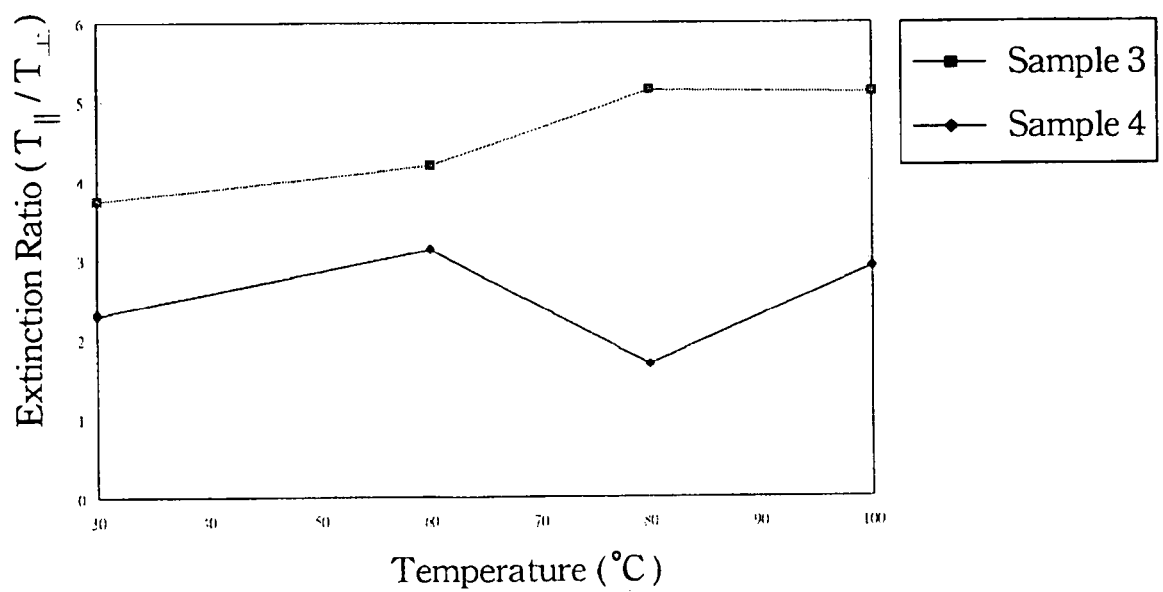
FIG. 10 is a temperature—extinction ratio diagram of the Experiment 009 with the present invent and an other comparable example.

Obviously, in FIG. 10, the extinction ratio of sample 3 is much better than sample 4. Especially the annealing temperature is above the clearing temperature of SLM90519 (130° C.). The liquid crystal molecules' arrangement of sample 4 would become much more disorder because of perturbation of liquid crystal molecules in the K solution. This perturbation makes the liquid crystal molecules in the K solution of Sample 3 into the same orientation. These certify that the optical devices 35 in Sample 3 are capable of aligning liquid crystal molecules adjacent to it. Furthermore, as the annealing temperature gets higher, the material shrinkage of Dsolite 4D5-57 in sample 4 becomes more serious. It makes Dsolite 4D5-57 hard to be coated evenly.

As described above, the present invention provides an optical device, which is capable of phase retardation to light. Also, the provided optical device is capable of enlarging viewing angles of the LCD. Comparing the present invention with prior arts, the LCD device of the present invention is relatively easier to be made. All of its making procedure could be carried out in conditions of low pressure and low temperature. In the procedure, it also needs neither an alignment layer nor a surface-active material, which is essentially needed by the prior arts. As a result, no rubbing step is needed in the present invention. This makes the present optical device less defects than the prior retardation plates. Furthermore, the present optical device is capable of aligning liquid crystal molecules adjacent to it. Hence, the multiple functions of the present optical device would also benefit the reduction of the used LCD devices.

While the preferred embodiment of the invention has been illustrated and described, it will be appreciated that various changes and modifications can be made therein without departing from the spirit and scope of the invention.

What is claimed is:

1. A method for making an optical device, which is functioning with retardation and alignment in one layer under lacking a surface-active material, comprising following steps of:
   providing a substrate, a polymerizable liquid crystal material and a mold having rows of trenches, said liquid crystal material further comprising a plurality of liquid crystal molecules;
   imprinting said polymerizable liquid crystal material on said substrate by said mold; and
   proceeding a cross-linking process to cure said liquid crystal material so as to align long axes of said liquid crystal molecules with a direction corresponding to said rows of trenches.

2. The method for making an optical device according to claim 1, wherein a pitch of said rows of trenches is ranged between 0.1 μm~5 μm.

3. The method for making an optical device according to claim 1, wherein a depth of said rows of trenches is ranged between 0.1 μm~2 μm.

4. The method for making an optical device according to claim 1 further comprising a step of applying said polymerizable liquid crystal material on said substrate before the step of imprinting said polymerizable liquid crystal material.

5. The method for making an optical device according to claim 1 further comprising a step of applying said polymerizable liquid crystal on said mold before the step of imprinting said polymerizable liquid crystal material.

6. The method for making an optical device according to claim 4, wherein the step of applying said polymerizable liquid crystal uses a method selected from the group of spin coating, slot die coating and blade coating.

7. The method for making an optical device according to claim 1, wherein an imprinting pressure for the step of imprinting said polymerizable liquid crystal material is less than 5 kg/cm$^2$.

8. The method for making an optical device according to claim 1, wherein said cross-linking process includes providing a predetermined temperature to said liquid crystal material.

9. The method for making an optical device according to claim 8, wherein said predetermined temperature is less than 200° C.

10. The method for making an optical device according to claim 1, wherein said cross-linking process includes exposing said liquid crystal material to light of a predetermined range of wavelength.

11. The method for making an optical device according to claim 10, wherein said predetermined range of wavelength is ranged between 200 nm~600 nm.

12. A method for making an optical device, which is functioning with retardation and alignment in one layer under lacking a surface-active material, comprising follow steps of:
    providing a substrate, a polymerizable liquid crystal material and a mold having rows of trenches;
    imprinting said polymerizable liquid crystal material on said substrate by said mold; and
    proceeding a cross-linking process to cure said liquid crystal material.

13. The method for making an optical device according to claim 12, therein a pitch of said rows of trenches is ranged between 0.1 μm~5 μm.

14. The method for making an optical device according to claim 12, wherein a depth of said rows of trenches is ranged between 0.1 μm-2 μm.

15. The method for making an optical device according to claim 12 further comprising a step of applying said polymerizable liquid crystal material on said substrate before the step of imprinting said polymerizable liquid crystal material.

16. The method for making an optical device according to claim 12 further comprising a step of applying said polymerizable liquid crystal on said mold before the step of imprinting said polymerizable liquid crystal material.

17. The method for making an optical device according to claim 15, wherein the step of applying said polymerizable liquid crystal uses a method selected from the group of spin coating, slot die coating and blade coating.

18. The method for making an optical device according to claim 12, wherein an imprinting pressure for the step of imprinting said polymerizable liquid crystal material is less than 5 kg/cm$^2$.

19. The method for making an optical device according to claim 12, wherein said cross-linking process includes providing a predetermined temperature to said liquid crystal material.

20. The method for making an optical device according to claim 19, wherein said predetermined temperature is less than 200° C.

21. The method for making an optical device according to claim 12, wherein said cross-linking process includes exposing said liquid crystal material to a light of a predetermined range of wavelength.

22. The method for making an optical device according to claim 21, wherein said predetermined range of wavelength is ranged between 200 nm~600 nm.

23. The method for making an optical device according to claim 12, wherein said polymerizable liquid crystal material is selected from the group of Nematic liquid crystal material, a chiral Nematic liquid crystal material, a smectic liquid crystal material and a discotic liquid crystal material.

24. An optical device, which is functioning without a surface-active material, comprising:
   rows of trenches on a surface; and
   a polymerizable liquid crystal material, further having liquid crystal molecules which are aligned along said rows of trenches to serve as an alignment layer.

25. The optical device according to claim 24, wherein a pitch of said rows of trenches is ranged between 0.1 µm~5 µm.

26. The optical device according to claim 24, wherein a depth of said rows of trenches is ranged between 0.1 µm~2 µm.

27. The method for making an optical device according to claim 5, wherein the step of applying said polymerizable liquid crystal uses a method selected from the group of spin coating, slot die coating and blade coating.

28. The method for making an optical device according to claim 16, wherein the step of applying said polymerizable liquid crystal uses a method selected from the group of spin coating, slot die coating and blade coating.

* * * * *